US012651513B2

(12) United States Patent
Bucci et al.

(10) Patent No.: US 12,651,513 B2
(45) Date of Patent: Jun. 9, 2026

(54) LOTTERY TICKET VENDING MACHINE

(71) Applicant: Brightstar Global Solutions Corporation, Providence, RI (US)

(72) Inventors: Paul A Bucci, Glocester, RI (US); Wayne Forsey, Riverview (CA); Thomas Quaranta, North Kingstown, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 574 days.

(21) Appl. No.: 18/188,901

(22) Filed: Mar. 23, 2023

(65) Prior Publication Data

US 2024/0321064 A1 Sep. 26, 2024

(51) Int. Cl.

*G07F 17/42* (2006.01)
*G07C 15/00* (2006.01)
*G07F 17/32* (2006.01)

(52) U.S. Cl.

CPC ........... *G07F 17/42* (2013.01); *G07C 15/005* (2013.01); *G07F 17/329* (2013.01)

(58) Field of Classification Search

CPC ..... B26F 3/00; B65H 2701/1936; G07B 5/02; G07C 15/005; G07F 11/68; G07F 11/1653; G07F 17/42; G07F 17/329

See application file for complete search history.

(56) References Cited

U.S. PATENT DOCUMENTS

| | | | | |
|---|---|---|---|---|
| 3,855,457 | A | 12/1974 | Amundson et al. | |
| 4,350,264 | A * | 9/1982 | Muller | G07F 11/045 221/281 |
| 5,222,624 | A | 6/1993 | Burr | |
| 5,268,561 | A | 12/1993 | Kimura et al. | |
| 5,408,417 | A | 4/1995 | Wilder | |
| 5,836,498 | A | 11/1998 | Turek | |
| 6,609,644 | B1 | 8/2003 | Menna | |
| 6,712,253 | B2 | 3/2004 | Hargrave et al. | |
| 6,714,838 | B2 | 3/2004 | Scrymgeour et al. | |
| 6,726,077 | B2 | 4/2004 | Roberts et al. | |
| 6,994,230 | B2 * | 2/2006 | Sams | G07F 11/42 312/35 |
| 7,032,774 | B2 | 4/2006 | Boehm et al. | |
| 7,383,099 | B2 | 6/2008 | Pollard et al. | |
| 7,562,798 | B2 | 7/2009 | Bartolone et al. | |
| 7,665,394 | B2 | 2/2010 | Roberts et al. | |
| 7,850,257 | B2 | 12/2010 | Roberts et al. | |
| 8,127,973 | B2 | 3/2012 | Mirkovic et al. | |
| 8,192,268 | B1 | 6/2012 | Karpe | |
| 8,210,921 | B1 | 7/2012 | Karpe | |
| 8,534,524 | B2 | 9/2013 | Businger et al. | |
| 8,550,294 | B2 | 10/2013 | Martin | |

(Continued)

FOREIGN PATENT DOCUMENTS

| | | | | |
|---|---|---|---|---|
| CN | 217443917 U * | 9/2022 | | G07F 17/42 |
| WO | 2004099915 A2 | 11/2004 | | |

*Primary Examiner* — Gene O Crawford
*Assistant Examiner* — Kelvin L Randall, Jr.
(74) *Attorney, Agent, or Firm* — Neal, Gerber & Eisenberg LLP

(57) ABSTRACT

A lottery ticket vending machine configured to consistently repeated precisely align its ticket bursters with its ticket collection receptacle of its front door to ensure proper delivery of the lottery tickets from the ticket bursters to the ticket collection receptacle.

11 Claims, 7 Drawing Sheets

(56) References Cited

U.S. PATENT DOCUMENTS

| | | | | |
|---|---|---|---|---|
| 9,613,337 | B1 | 4/2017 | Garrison | |
| 9,685,026 | B1 | 6/2017 | Garrison | |
| 10,438,452 | B2 | 10/2019 | Ferron et al. | |
| 11,010,987 | B2 | 5/2021 | Bucci | |
| 2003/0120381 | A1 | 6/2003 | Perin et al. | |
| 2004/0000572 | A1 | 1/2004 | Engelhardt, Jr. et al. | |
| 2004/0254008 | A1 | 12/2004 | Anderson et al. | |
| 2005/0178810 | A1 | 8/2005 | Woods et al. | |
| 2007/0017978 | A1 | 1/2007 | Ho | |
| 2007/0088459 | A1 | 4/2007 | Pollard et al. | |
| 2010/0308071 | A1 | 12/2010 | Businger | |
| 2011/0042403 | A1* | 2/2011 | Martin | B65H 5/04<br>221/124 |
| 2014/0008407 | A1 | 1/2014 | Bucci et al. | |
| 2016/0232741 | A1 | 8/2016 | Assis et al. | |
| 2018/0108203 | A1* | 4/2018 | Li | G07F 11/1653 |
| 2022/0108562 | A1* | 4/2022 | Claude | G07F 17/329 |
| 2022/0114842 | A1 | 4/2022 | Mejenborg et al. | |
| 2022/0114860 | A1 | 4/2022 | Mejenborg et al. | |
| 2023/0084907 | A1* | 3/2023 | Gonzalez | G07F 11/005<br>700/232 |
| 2024/0021054 | A1 | 1/2024 | Topalian et al. | |

* cited by examiner

LOTTERY TICKET VENDING MACHINE

CROSS-REFERENCE TO RELATED APPLICATIONS

This application is related to the following commonly owned co-pending patent application: U.S. application Ser. No. 18/480,804, entitled "LOTTERY TICKET VENDING MACHINE,".

BACKGROUND

The present disclosure relates to lottery ticket vending machines.

Lottery tickets such as instant lottery tickets may be printed on a long strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a machine housing including an openable front door, the front door including a ticket collection receptacle, the ticket collection receptacle defining a ticket receiving slot; a ticket drawer column in the machine housing, the ticket drawer column including a plurality of ticket drawers, each of the ticket drawers configured to hold a pack of lottery tickets; a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the ticket receiving slot of the ticket collection receptacle; a sensor connected to one of a wall of the ticket burster and a wall of the ticket collection receptacle; a target connected to the other of the wall of the ticket burster and the wall of the ticket collection receptacle; and a controller. The controller is configured to cause the ticket burster to move to the ticket dispense position based on a signal from the sensor when the sensor senses the target.

In various other embodiments, the present disclosure relates to a lottery ticket vending machine including: a machine housing including an openable front door, the front door including a ticket collection receptacle, the ticket collection receptacle defining a ticket receiving slot; a plurality of ticket drawer columns in the machine housing, each ticket drawer column including a plurality of ticket drawers, each of the ticket drawers configured to hold a pack of lottery tickets; a plurality of ticket bursters in the machine housing, each ticket burster associated with a different one of the ticket drawer columns, each ticket burster defining a ticket inlet and a ticket outlet, each ticket burster movable to a separate ticket dispense position adjacent to the ticket collection receptacle and such that the ticket outlet of that ticket burster is aligned with the ticket receiving slot of the ticket collection receptacle; a plurality of sensors, each sensor connected to a different one of the ticket bursters; a target connected to the ticket collection receptacle; and a controller. The controller is configured to cause each of the ticket bursters to move to the ticket dispense position for said ticket burster based on signals from the sensor connected to said ticket burster when said sensor senses the target.

In various other embodiments, the present disclosure relates to a lottery ticket vending machine including: a machine housing including an openable front door, the front door including a ticket collection receptacle, the ticket collection receptacle defining a ticket receiving slot; a plurality of ticket drawer columns in the machine housing, each ticket drawer column including a plurality of ticket drawers, each of the ticket drawers configured to hold a pack of lottery tickets; a plurality of ticket bursters in the machine housing, each ticket burster associated with a different one of the ticket drawer columns, each ticket burster defining a ticket inlet and a ticket outlet, each ticket burster movable to a separate ticket dispense position adjacent to the ticket collection receptacle and such that the ticket outlet of that ticket burster is aligned with the ticket receiving slot of the ticket collection receptacle; a plurality of targets, each target connected to a different one of the ticket bursters; a plurality of sensors connected to the ticket collection receptacle; and a controller. The controller is configured to, for each of the ticket bursters, to move the ticket burster to the ticket dispense position for said ticket burster based on signals from the sensor connected to the ticket collection receptacle and associated with said ticket burster when said sensor sense the target connected to said ticket burster.

Additional features are described in, and will be apparent from, the following Detailed Description and the figures.

DETAILED DESCRIPTION

Figure 1:
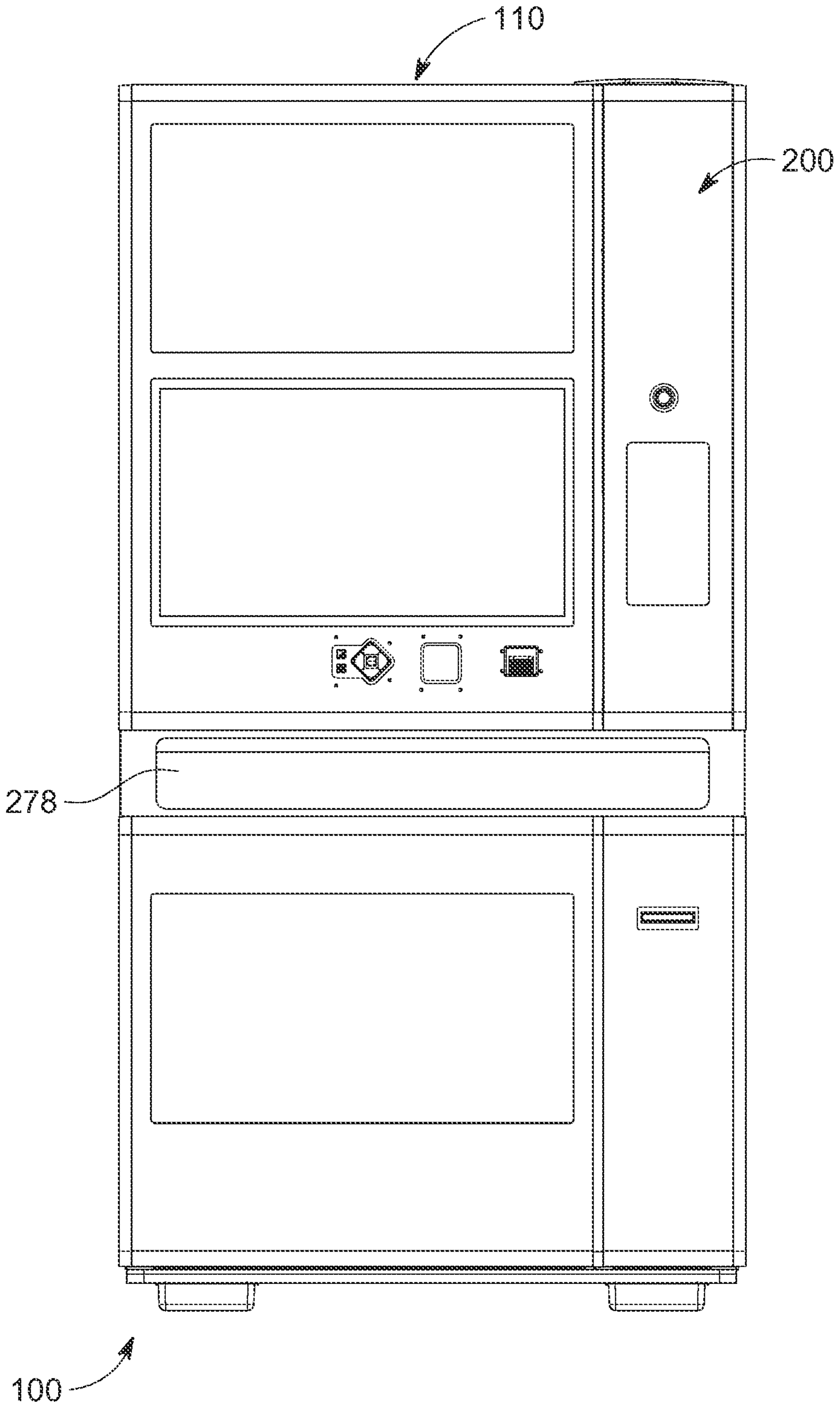
FIG. 1 is a front view of a lottery ticket vending machine of one example embodiment of the present disclosure shown with its front door in a closed position, wherein the front door includes a ticket retrieval slot that provides access to a ticket collection receptacle of the front door.

In various embodiments, the present disclosure relates to a lottery ticket vending machine that is configured to repeatedly precisely align its ticket bursters with its ticket collection receptacle of its front door to ensure proper delivery of the lottery tickets from the ticket bursters to the ticket collection receptacle. In various embodiments, each of the tickets bursters includes a suitable sensor configured to sense a target on the ticket collection receptacle for facilitating precise positioning of that ticket burster relative to the ticket collection receptacle. In various other embodiments, each of the tickets bursters includes a suitable target and the ticket collection receptacle includes sensors for facilitating precise positioning of the ticket bursters relative to the ticket collection receptacle.

For a better understanding of the present disclosure, example instant lottery tickets are first generally described herein.

Various known instant lottery tickets are single game instant lottery tickets. An example single game instant lottery ticket can include: (1) a ticket substrate have a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types of instant lottery tickets and other types of lottery tickets that can be dispensed in a same or similar manner as these types of instant lottery tickets.

Various instant lottery tickets are often arranged after manufacture (which includes after complete printing) in instant lottery ticket packs for storage, organization, sorting, picking, shipping to instant lottery ticket distributors or ticket retailers, and validation. Instant lottery ticket packs can include a plurality of instant lottery tickets (that are all of the same type, same size, and for the same game(s)), and can be protected for storage and shipping by a transparent pack wrapping, such as transparent plastic wrapping, securely wrapped around the plurality of instant lottery tickets. A pack of instant lottery tickets can include all of the instant lottery tickets attached to each other but joined by perforations. Such instant lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to be dispensed via an instant lottery ticket vending machine.

Turning now to FIGS. 1, 2, 3, 4, 5, 6, and 7, a lottery ticket vending machine of one example embodiment of the present disclosure is generally illustrated and indicated by numeral 100. The lottery ticket vending machine 100 may be referred to herein as the "vending machine" for brevity.

The illustrated example lottery ticket vending machine 100 generally includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 of the lottery ticket vending machine 100 includes a ticket collection receptacle 250 as further described herein. The quantity of ticket drawer columns and associated movable ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not shown) positioned in and supported by the machine housing 110; and (2) various purchaser interface components (not labeled) that are part of the front door 200. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control(s) the operation of the ticket vending machine 100 including the movable ticket bursters 400*a*, 400*b*, and 400*c* as further discussed herein to facilitate the dispensing of each requested instant lottery ticket. The controller(s) can be any suitable type of controller (such as a programmable logic controller) that includes any suitable processing device (s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket vending machine 100. The purchaser interface components include one or more display devices, one or more input devices, and one or more payment acceptors. The purchaser interface components enable purchasers to use such components to determine the instant lottery tickets available from the ticket vending machine 100, and to select and pay for any of those instant lottery tickets held by the ticket vending machine 100 that the purchaser desires to obtain. The purchaser interface components can display images and information to inform purchasers of the different instant lottery tickets available from the ticket vending machine 100 and to assist in completing the selection and purchase of such instant lottery tickets. These purchaser interface components can take various different forms as well known in the industry, and are thus not described in detail herein for brevity.

Figure 2:
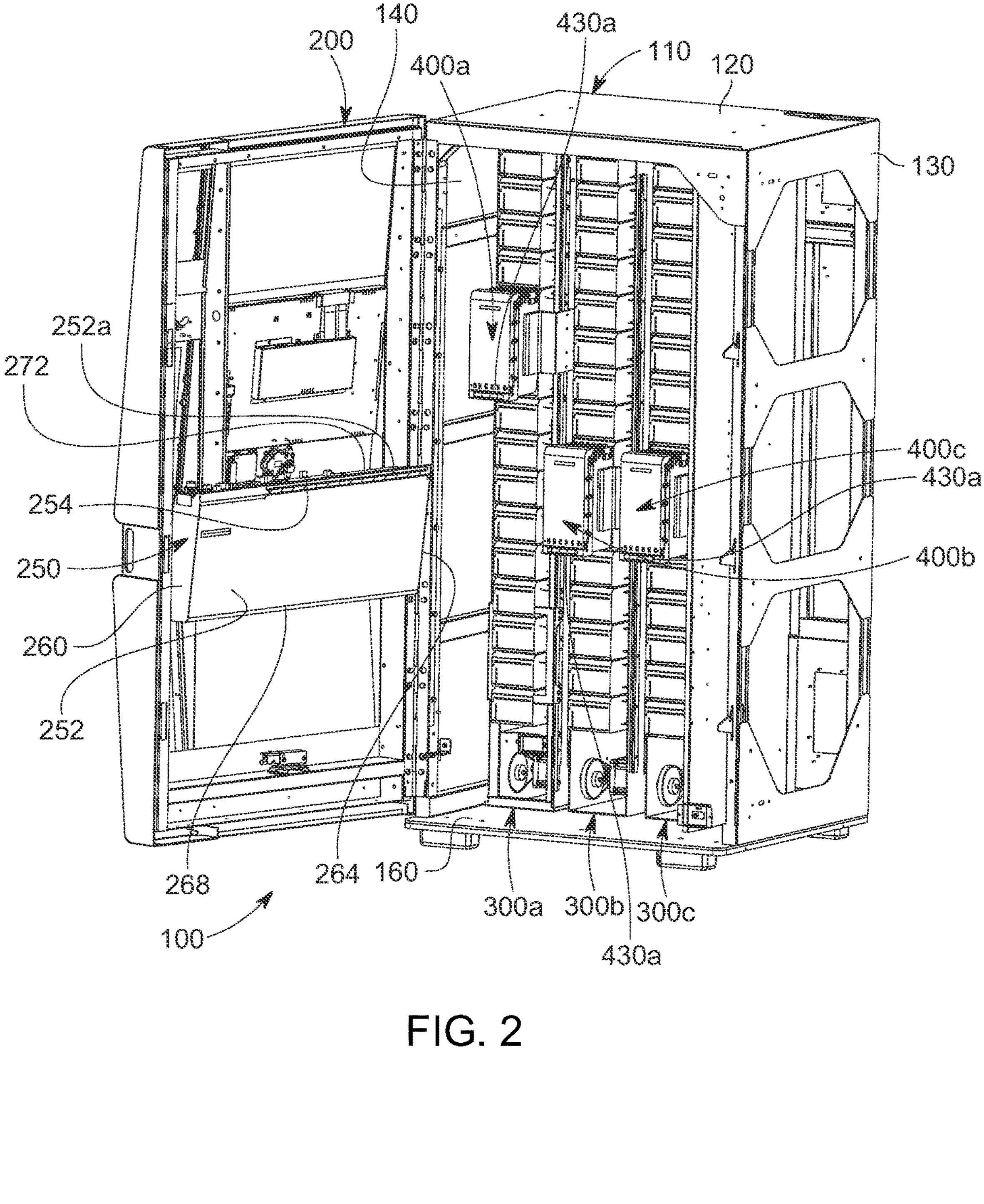
FIG. 2 is a front perspective view of the lottery ticket vending machine of FIG. 1 shown with the front door in an open position, shown with a left side wall outer panel removed, showing three ticket drawer columns and three movable ticket bursters respectively associated the three ticket drawer columns, and showing the rear side of the ticket collection receptacle of the front door.
Figure 3:
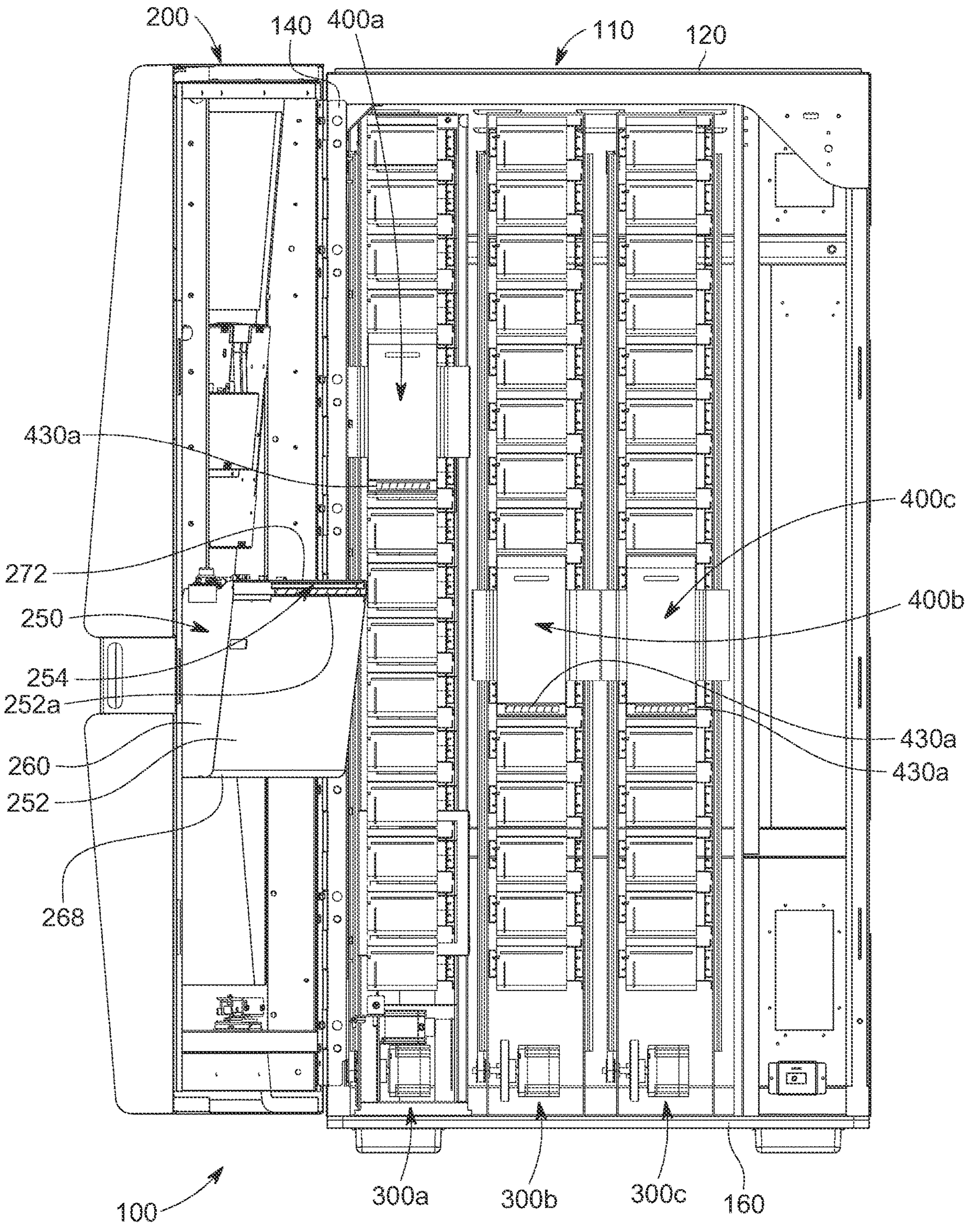
FIG. 3 is a front perspective view of the lottery ticket vending machine of FIG. 1 shown with the front door in an open position, showing the three ticket drawer columns and the three movable ticket bursters respectively associated the three ticket drawer columns, and showing the left side and rear side of the ticket collection receptacle of the front door.
Figure 4:
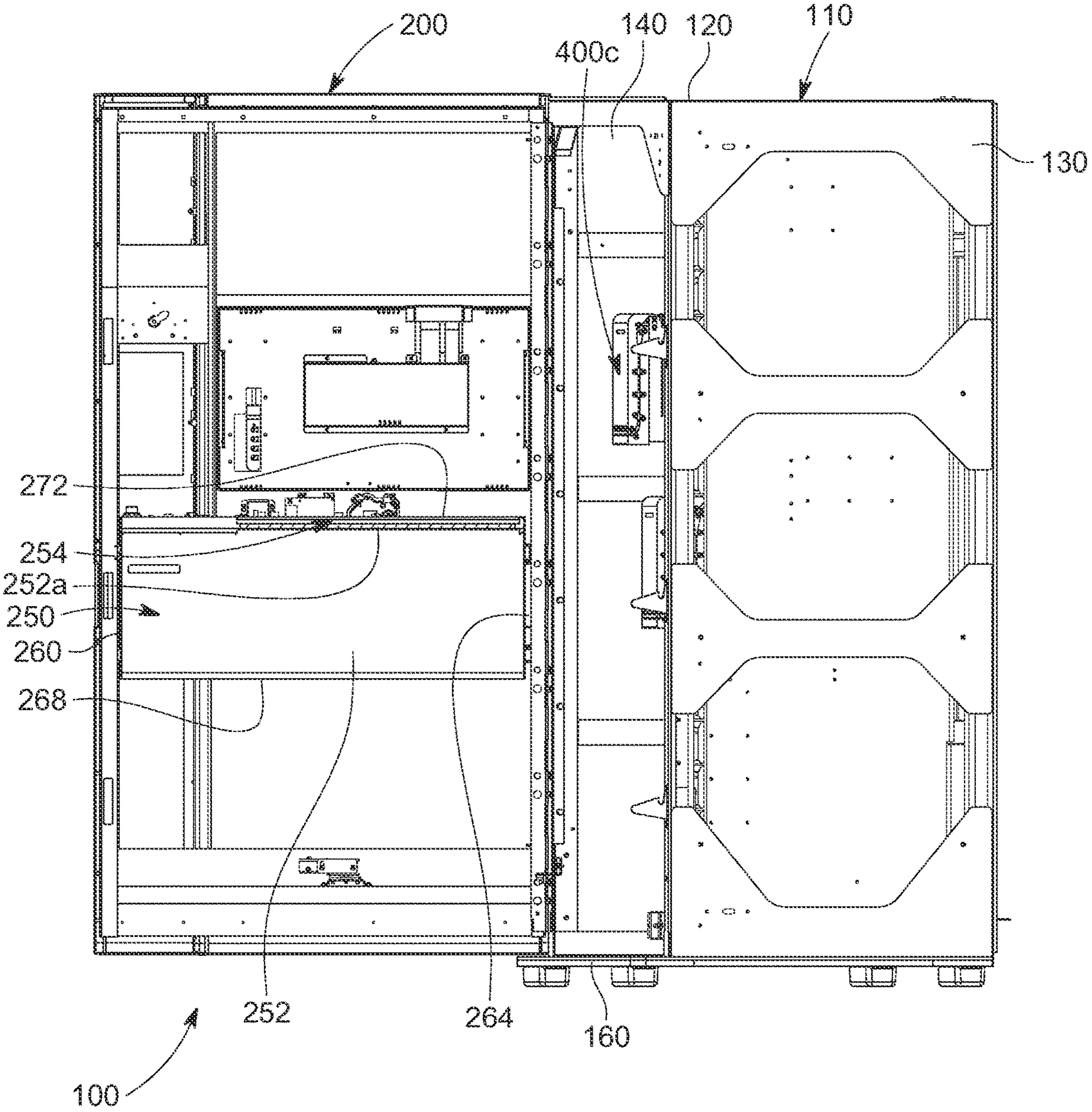
FIG. 4 is a left side view of the lottery ticket vending machine of FIG. 1 shown with the front door in an open position, shown with the left side wall outer panel removed, showing one of the movable ticket bursters, and showing the rear side of the ticket collection receptacle of the front door.

In this illustrated example embodiment, the machine housing 110 includes a top wall 120, spaced-apart left and right side walls 130 and 140, a rear wall 150, a base 160, and the openable front door 200 pivotally connected to the right side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 (as shown in FIG. 1) to an open position allowing access to the interior of the machine housing 110 (such as shown in FIGS. 2, 3, and 4). The front door 200 is mounted by hinges (not shown or labeled) to the right side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The machine housing can be alternatively configured in accordance with the present disclosure.

The ticket collection receptacle 250 of the front door 200 is configured to receive lottery tickets from each of the movable ticket bursters 400*a*, 400*b*, and 400*c* as further described herein. The ticket collection receptacle 250 is configured to hold each lottery ticket received from the respective movable ticket burster to enable the respective purchaser to retrieve the dispensed lottery ticket from the ticket collection receptacle 250. In this illustrated example embodiment, the ticket collection receptacle 250 includes a rear wall 252, a left side wall 260, a right side wall 264, a bottom wall 268, a top wall 272, and a front wall 276. The front wall 276 and the front door 250 define an elongated horizontally extending purchase ticket retrieval slot 278 (best shown in FIG. 1). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The rear wall 252 of the ticket collection receptacle 250 includes inner edges (not labeled) that define an elongated horizontally extending ticket receiving slot 254 (best seen in FIGS. 6 and 7). The ticket receiving slot 254 is (and needs to be) small enough so that a purchaser cannot insert the purchaser's hand (or other object) through the ticket receiving slot 254 and thereby cannot access any of the lottery tickets in the ticket drawers of the ticket drawer columns 300*a*, 300*b*, or 300*c* in an unauthorized manner. The ticket collection receptacle can be alternatively configured in accordance with the present disclosure; although such alternative configurations will include one or more relatively small ticket receiving slots for such security purposes.

Figure 7:
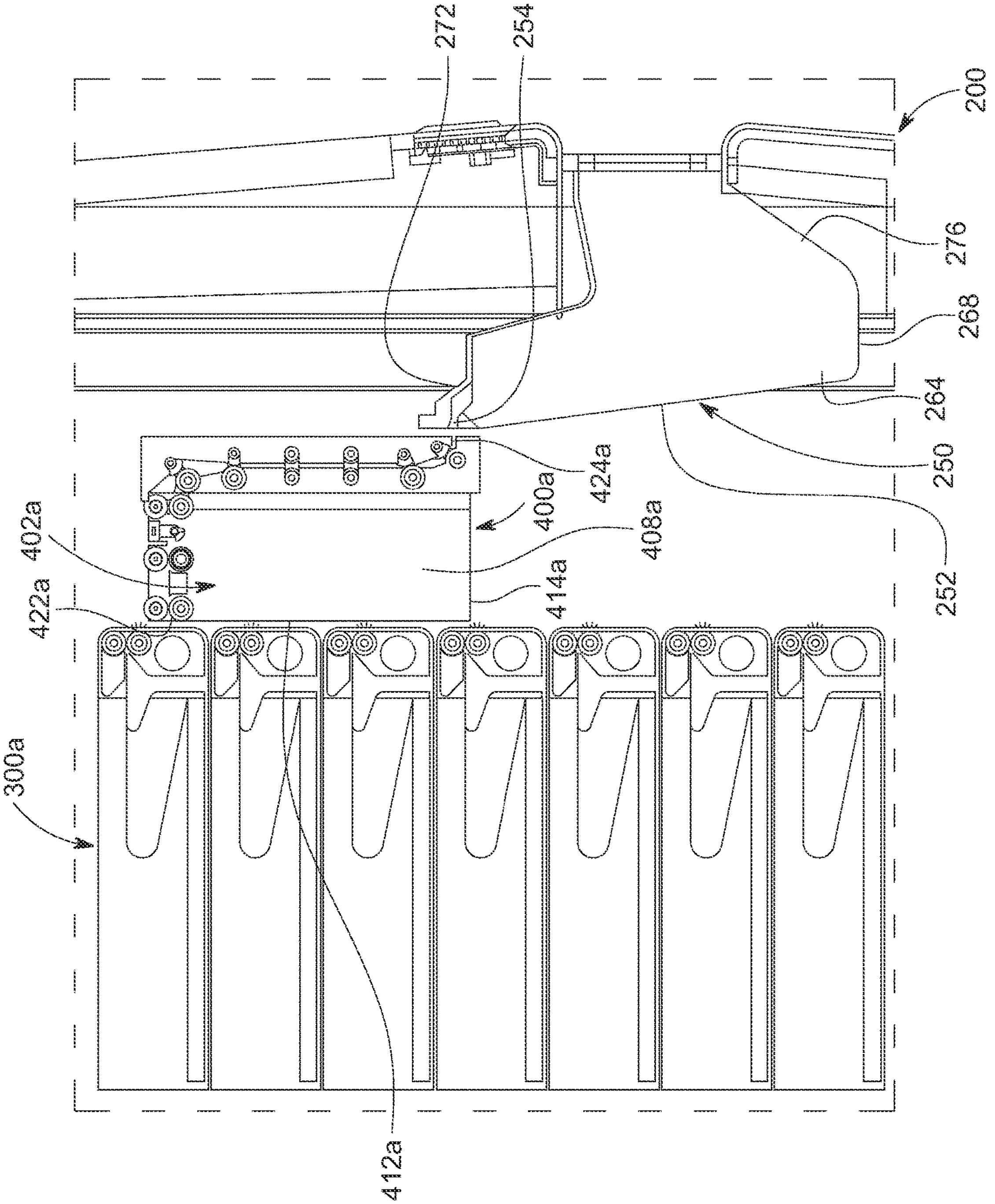
FIG. 7 is an enlarged fragmentary side view of one of the ticket bursters in a ticket dispense position where it is aligned with the ticket collection receptacle of the closed front door of the lottery ticket vending machine of FIG. 1.

As shown in FIG. 7, the relatively small ticket outlets of the ticket bursters (such as ticket outlet 424*a* of the ticket burster 400*a* as described below) must be aligned with the relatively small ticket receiving slot 254 of the ticket collection receptacle 254. As further explained below, the present disclosure ensures that the ticket bursters 400*a*, 400*b*, and 400*c* move to suitable ticket dispense positions where they are precisely aligned with this narrow ticket receiving slot 254 (such as shown in FIG. 7) to move the tickets from the ticket bursters 400*a*, 400*b*, and 400*c* through this narrow ticket receiving slot 254 and into the ticket collection receptacle 250.

In this example embodiment, the ticket collection receptacle 250 includes a horizontally extending target 252*a* attached to the rear wall 252 and extending adjacent to and below the entire length or substantially the entire length of the ticket receiving slot 254. The target 252*a* faces the interior of the housing 110 and specifically faces the ticket bursters 400*a*, 440*b*, and 400*c*. In other embodiments, the target 252*a* can be otherwise suitably sized, positioned, and otherwise configured. For example, the target 252*a* can extend adjacent to and above the entire length or substantially the entire length of the ticket receiving slot 254. As further described below, the target 252*a* is configured to be sensed by sensors of the ticket bursters 400*a*, 400*b*, and 400*b* (such as sensor 430*a* of ticket burster 400*a*) to ensure that the ticket bursters 400*a*, 400*b*, and 400*b* are properly aligned with the ticket collection receptacle 250 before the ticket bursters 400*a*, 400*b*, and 400*b* attempt to move tickets into the ticket collection receptacle 250. This ensures that the ticket bursters 400*a*, 400*b*, and 400*b* will precisely deliver the tickets into the ticket collection receptacle 250.

Each of the ticket drawer columns 300*a*, 300*b*, and 300*c* are identical in this example embodiment. For brevity, only ticket drawer column 300*a* is described herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets such as instant lottery tickets for dispensing by the ticket vending machine 100. The ticket drawers can vary in quantity, size, and shape depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated that two or more ticket drawers can hold the same type of lottery tickets. In various embodiments, each of the ticket drawers is configured to feed each instant lottery ticket held by that ticket drawer into the associated ticket burster 400*a* when the ticket burster 400*a* is moved into alignment with such ticket drawer for receipt, bursting, and dispensing of that lottery ticket. Bursting of the lottery ticket is the industry term for separating a lottery ticket from a pack of lottery tickets held in a ticket drawer. In this illustrated embodiment, the ticket drawers do not burst the lottery tickets and do not include any mechanisms for busting the lottery tickets. Rather, in this illustrated embodiment, the moveable ticket burster 400*a* is configured to receive and burst the lottery tickets fed by the lottery ticket drawers of the ticket drawer column 300*a* into the ticket burster 400*a*.

The movable ticket burster 400*a* is supported by one or more burster supporters (such as burster supporter 480*a*).

The burster supporter(s) can be any suitable structure(s) that supports the ticket burster 400*a* in a manner that enables the ticket burster 400*a* to vertically move to any of a plurality of different ticket receipt positions that are associated with and in alignment with the respective ticket drawers of the ticket drawer column 300*a*. The burster supporter(s) also support the ticket burster 400*a* in a manner that enables the ticket burster 400*a* to vertically move to into alignment with the ticket collection receptacle 250 as further discussed herein.

The ticket vending machine 100 includes one or more actuators (not shown) that control movement of the ticket burster 400*a* under control of the controller of the ticket vending machine 100 and/or the controller (described below) of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporter 480*a* to different vertical locations including a plurality of the locations respectively associated and aligned with each of the ticket drawers of the ticket drawer column 300*a* such that the ticket burster 400*a* is positioned to receive one or more of the instant lottery tickets stored in each respective ticket drawers for obtaining and dispensing that instant lottery ticket into the ticket receptacle 400 for the purchaser as requested by the purchaser.

Figure 5:
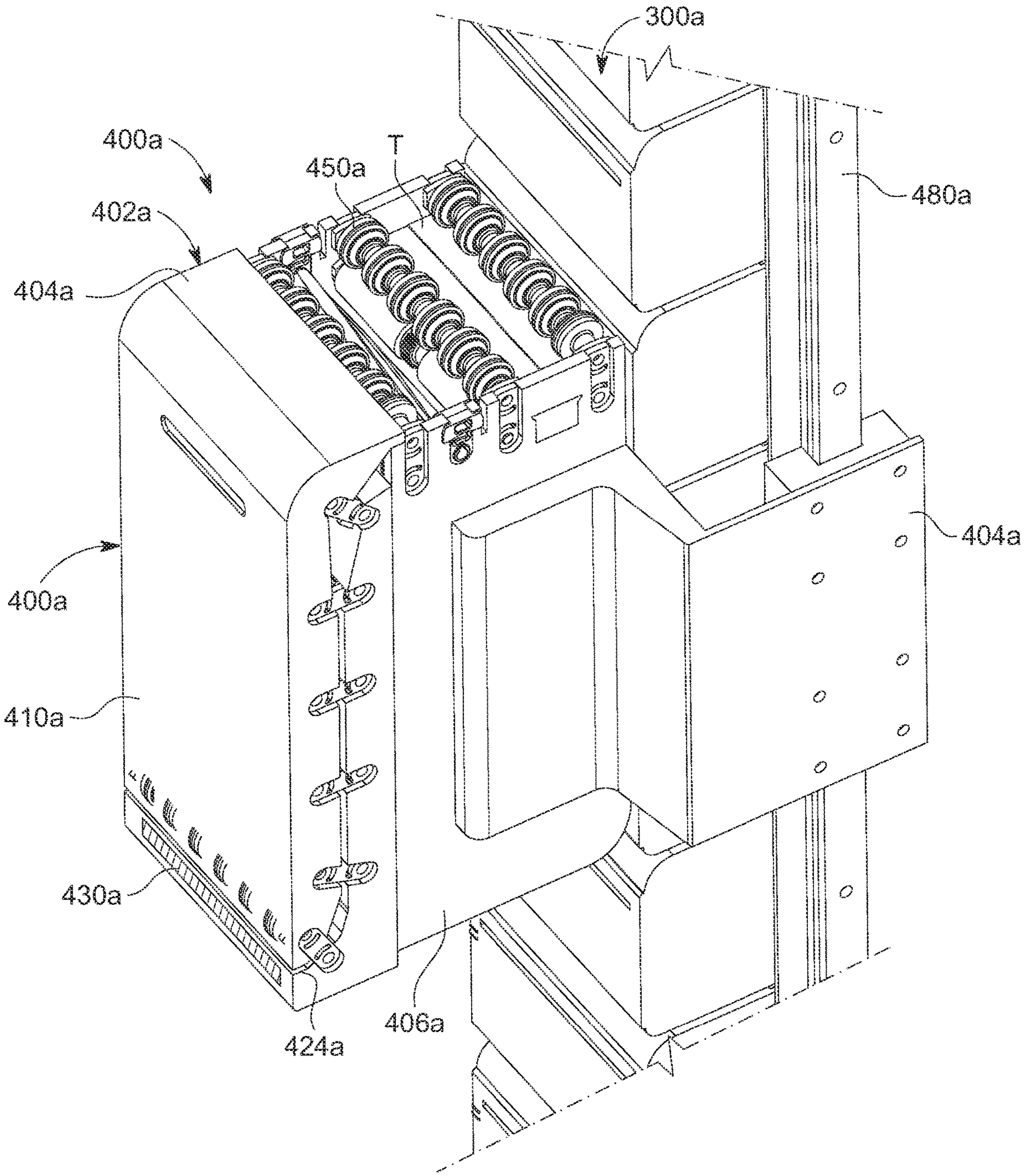
FIG. 5 is an enlarged fragmentary perspective view of a first one of the ticket drawer columns and a first one of the ticket bursters that is associated with that ticket drawer column of the lottery ticket vending machine of FIG. 1.
Figure 6:
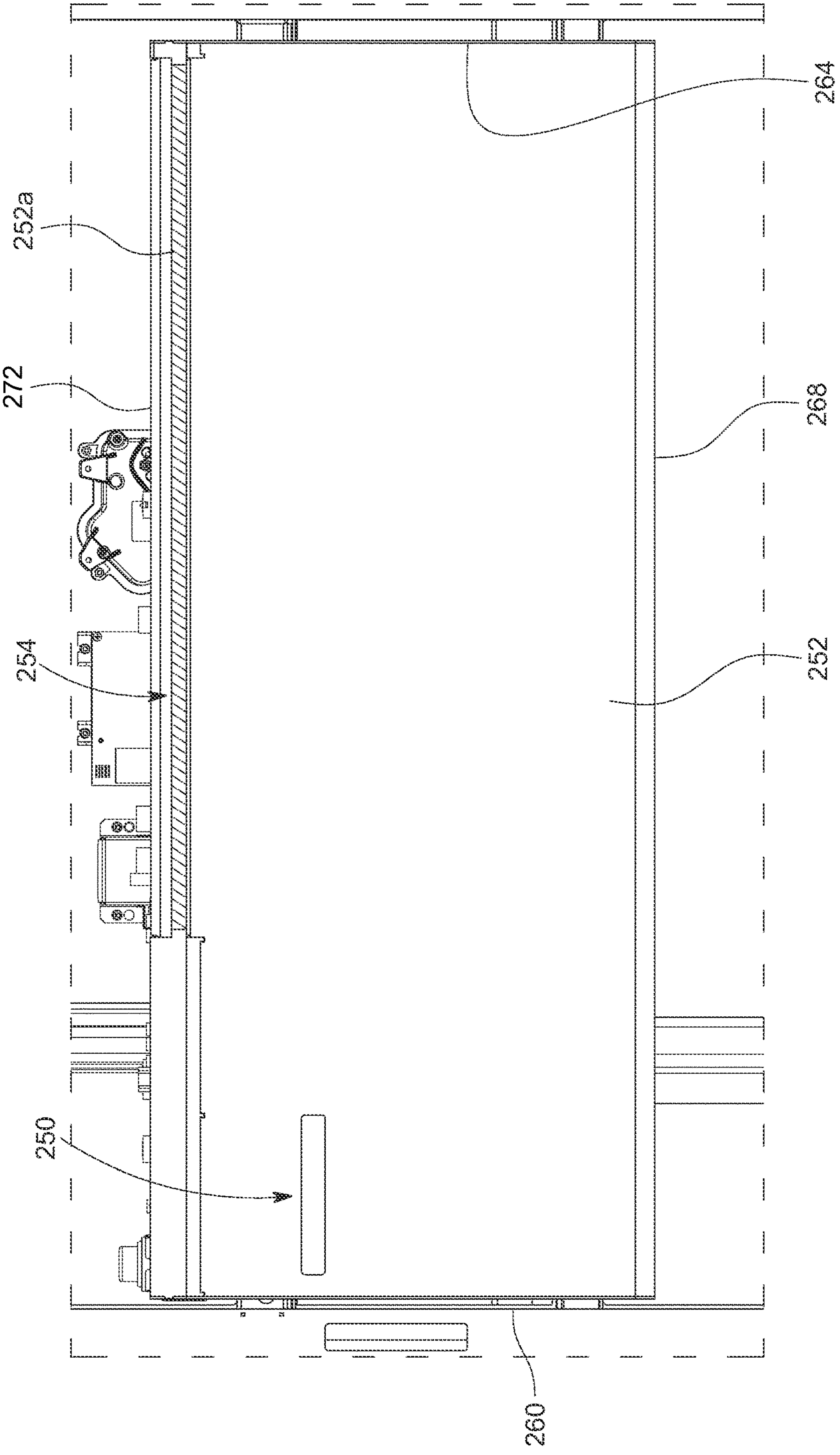
FIG. 6 is an enlarged fragmentary rear view of part of the front door of the lottery ticket vending machine of FIG. 1 showing the rear surface of the ticket collection receptacle of the front door.

As best shown in FIG. 5, the example movable ticket burster 400*a* generally includes: (a) a burster housing 402*a*; (b) one or more burster supporter connecters (such as burster support connector 404*a* connecting the burster housing 402*a* to the burster supporter 480*a*); (c) a sensor 430*a* supported by the burster housing 402*a*; (d) a ticket cutter (not shown) in and supported by the burster housing 402*a*; (e) a plurality of ticket engagers 450*a* supported by the burster housing 402*a*; and (f) a burster controller (not shown). The ticket burster 400*a* is generally configured to burst the perforations between an instant lottery ticket moved from a ticket drawer into the ticket burster 400*a* and the next instant lottery ticket of the strip in the ticket drawer to enable the instant lottery ticket to be dispensed into the ticket receptacle 250. This prevents a person from improperly tearing an instant lottery ticket or being able to pull an extended quantity of instant lottery tickets from one of the ticket packs in one of the ticket drawers.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster. The burster controller can be hard wired or wirelessly connected to and in communication with the cutter, the actuators for the driven rollers, and any actuators on or associated with the ticket burster that cause the movement of the ticket burster. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be wirelessly connected to and in communication with the cutter, the actuators for the driven rollers, and any actuators on the ticket burster or the burster supporter that cause the movement of the ticket burster. In various embodiments, the burster controller is not supported by the burster housing 402*a* and is thus separate from the burster housing.

The burster housing 402*a* generally includes a top member 404*a*, spaced-apart side members 406*a* and 408*a*, a front member 410*a*, a rear member 412*a*, and a bottom member 414*a*. The burster housing 402*a* also includes a plurality of internal members (not individually labeled) that define a ticket inlet 422*a* through which the ticket burster 400*a* is configured to receive a lottery ticket (such as lottery ticket T) from a ticket drawer of the ticket drawer column 300*a*, a ticket outlet 424*a* through which the ticket burster 400*a* is configured to move the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*. The ticket outlet 424*a* defined by the burster housing 402*a* is thus a relatively narrow ticket outlet.

In this illustrated example embodiment, the sensor 430*a* of the ticket burster 400*a* is on the front member 410*a* of the housing 402*a* of the ticket burster 400*a* and is configured to detect the target 252*a* on the ticket collection receptacle 250 as further described herein. The sensor 430*a* is in a position facing the front door 200 and the ticket collection receptacle 250 thereof. The sensor 430*a* is adjacent to and below the ticket outlet 424*a* of the ticket burster 400*a*. The sensor 430*a* can be alternatively positioned on the ticket burster housing 402*a* in accordance with the present disclosure. For example, the sensor 430*a* can be attached to either of the side members 406*a* and 408*a* of the housing 402*a* (in a position facing the front door 200 and the ticket collection receptacle 250 thereof). In another example, the sensor 430*a* can be positioned adjacent to and above the ticket outlet 424*a* of the ticket burster 400*a*. In various embodiments, the sensor 430*a* is communicatively connected (via hardwire or wirelessly) to the ticket burster controller and/or the controller of the vending machine 100. In one example embodiment, the sensor 430*a* is configured to communicate with the burster controller to provide sensed data to the burster controller, and the burster controller is configured to communicate that data to the controller of the ticket vending machine 100. In this example embodiment, the sensor 430*a* is configured to send suitable signals to such controller(s) when the sensor senses the target 252*a* on the back of the ticket collection receptacle 250. In other example embodiments, the sensor 430*a* is configured to directly communicate with the controller of the ticket vending machine 100. In this example embodiment, the sensor 430*a* is configured to send suitable signals to such controller when the sensor senses the target 252*a* on the back of the ticket collection receptacle 250.

As mentioned above, the ticket burster 400*a* must be repeated precisely aligned with the ticket collection receptacle 250 such that the ticket outlet 424*a* of the ticket burster 400*a* is aligned with the ticket receiving slot 254 of the ticket collection receptacle 250 for the transfer of the lottery ticket from the ticket burster 400*a* to the ticket collection receptacle 250 (as best shown in FIG. 7). This can be difficult to consistently achieve over the extended life of the lottery ticket vending machine 100 at least due to the following issues: (1) the ticket outlet 424*a* of the ticket burster 400*a* is relatively narrow; (2) the ticket receiving slot 278 of the ticket collection receptacle 250 is relatively narrow; (3) the front door 200 can be relatively heavy and is attached by hinges to the side wall 140 of the housing 110 which can lead over time to slight variations of the exact position of the front door 200 and thus the exact position of the ticket collection receptacle 250 over time or at different points in time; (4) the constant movements of the ticket bursters 400*a*, 400*b*, and 400*c* can cause their respective positions and the positions of the ticket burster supports to slightly vary over time; (5) assembly error; (6) component, size, shaped, or other configuration manufacturing error; and (7) overall manufacturing tolerances.

In alternative embodiments, one or more of the ticket bursters can be configured such that the burster housing is rotatable about a horizontal axis to separate (via a tearing and/or twisting motion) each instant lottery ticket along the perforations connecting that instant lottery ticket to the next instant lottery ticket in the strip. In such embodiments, the positions of the ticket bursters may additionally vary and make the repeated precise alignment with the ticket collection receptacle 250 more difficult to consistently achieve.

The sensors, the target, and the controller(s) described herein better enable the ticket bursters 400*a*, 400*b*, and 400*c* to repeated and consistently be precisely aligned with the ticket collection receptacle 250 such that the ticket outlet 424*a* of the ticket burster 400*a* is aligned with the ticket receiving slot 254 of the ticket collection receptacle 250 for the transfer of the lottery tickets to the ticket collection receptacle 250 over the extended life of the lottery ticket vending machine 100.

One example method of operation of the ticket vending machine 100 is now described. It should be appreciated that the following example is not meant to limit of the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100. Responsive to and after the purchaser selects the instant lottery ticket (from the plurality of different instant lottery tickets available from the ticket vending machine 100) using one or more of the purchaser interface components and specifically using one or more of the input devices and one or more of the payment acceptors to select and pay for the instant lottery ticket, the ticket vending machine 100 causes the ticket burster 400*a* to obtain and dispense that instant lottery ticket into the ticket collection receptacle 250.

This includes: (1) moving the ticket burster 400*a* into a ticket receipt position associated with and in alignment with the respective ticket drawer of the ticker drawer column 300*a* that holds the instant lottery ticket pack of the selected type of instant lottery ticket requested by the purchaser; (2) causing the ticket drawer to feed a leading edge of the top or front most instant lottery ticket of that pack in that ticket drawer into the ticket inlet 422*a* of the ticket burster 400*a*; (3) causing the ticket engagers of the ticket burster 400*a* to engage and cause that instant lottery ticket to move along the ticket movement path; (4) at the appropriate time when the perforations connecting that instant lottery ticket to the next instant lottery ticket of that strip are aligned with the ticket cutter of the ticket burster 400*a*, causing ticket cutter to cut the perforations and thus separate that instant lottery ticket from the next instant lottery ticket in the strip; (5) after the separation, causing (such as by permitting or allowing) the ticket drawer to retract any portion of that next instant lottery ticket of the strip from the ticket burster 400*a*; (6) moving the ticket burster 400*a* to a ticket dispense position adjacent to the ticket collection receptacle 250 and stopping the ticket burster 400*a* in a position when the sensor 430*a* of the ticket burster 400*a* senses the target 252*a* of the ticket collection receptacle 250 such that the ticket outlet 424*a* of the ticket burster 400*a* is precisely aligned with the ticket receiving slot 254 of the ticket collection receptacle 250; and (7) causing the ticket engagers to move the instant lottery ticket along the ticket movement path of the ticket burster 400*a* toward the ticket outlet 424*a* of the ticket burster 400*a*, out of the ticket outlet 424*a*, through the ticket receiving slot 254, and into the ticket collection receptacle 250. At this point, the purchaser can obtain the instant lottery ticket from the ticket collection receptacle 250.

In various example embodiments, the controller(s) is/are configured to cause the sensor 430*a* to search for the target 252*a* until the sensor 430*a* fines the target 252*a*.

In various example embodiments, the sensor 430*a* and the target 252*a* provide positional feedback to the controller(s).

In various example embodiments, the sensor 430*a* is configured to emit light waves (such as beam) to read the target 252*a* on the rear side of the ticket collection receptacle 250. In various such embodiments, the target 252*a* includes a reflective material.

In various example embodiments, the target 252*a* is configured to emit light waves and the sensor 430*a* is configured to detect such light waves. In various such embodiments, the target 252*a* includes a light source such as an LED.

In various example embodiments, the sensor 430*a* is configured to emit light waves (such as beam) to sense the void or opening in the rear side of the ticket collection receptacle 250. In this embodiments, the void or opening functions as the target.

In various example embodiments, the target 252*a* is magnetic and the sensor 430*a* is configured to detect the magnetic field. In various such embodiments, the target 252*a* includes a powered magnet (i.e., an electro-magnet) or a non-powered magnet.

In various example embodiments, the sensor 430*a* includes a camera configured to search for the target that is in the form of an image.

In various example embodiments, the sensor 430*a* includes a mechanical switch configured to be activated by an activator target 252*a*. In one embodiment, the activator target 252*a* extends from the ticket collection receptacle 250.

The present disclosure contemplates the use of multiple targets on the ticket collection bucket.

The present disclosure contemplates the use of multiple sensors on one or more of the ticket bursters.

As mentioned above, in alternative example embodiments, one or more sensors are located on the ticket collection receptacle 250 and separate targets are located on the ticket bursters 400*a*, 400*b*, and 400*c*.

As explained above, in the above described illustrated example embodiment, the front wall of the ticket burster defines the ticket outlet of the ticket burster, the sensor is connected to the front wall of the ticket burster adjacent to and below the ticket outlet of the ticket burster, the rear wall of the ticket collection receptacle defines the ticket receiving slot, and the target is connected to the rear wall of the ticket collection receptacle adjacent to and below the ticket receiving slot. In other example embodiments, the front wall of the ticket burster defines the ticket outlet of the ticket burster, the sensor is connected to the front wall of the ticket burster adjacent to and above the ticket outlet of the ticket burster, the rear wall of the ticket collection receptacle defines the ticket receiving slot, and the target is connected to the rear wall of the ticket collection receptacle adjacent to and above the ticket receiving slot. Thus, in certain embodiments, the sensors and target are respectively adjacent to and below the ticket outlet and the ticket receiving slot, and in other embodiments, the sensors and target are respectively adjacent to and above the ticket outlet and the ticket receiving slot.

In various alternative embodiments, the ticket vending machine can include sensors above and below the ticket outlet of the ticket burster and targets above and below the ticket receiving slot of the ticket collection receptacle.

In various alternative embodiments, the ticket vending machine can include sensors above and below the ticket receiving slot of the ticket collection receptacle and targets above and below the ticket outlet of the ticket burster.

In various embodiments, after the front door is closed, the controller can move one or more of the ticket bursters to determine the location of the ticket collection receptacle 250 and the ticket receiving slot 254 for calibration purposes. In certain such embodiments, the controller thus stores data regarding the determined locations and later uses such data to position the ticket bursters relative to the ticket collection receptacle.

In various alternative embodiments, the vending machine includes multiple ticket collection receptacles and associated ticket receiving slots, and thus multiple targets or sensors on such ticket collection receptacles.

In various alternative embodiments, the ticket vending machine of the present disclosure can have more than one ticket burster for one or more of the ticket drawer columns such that they can operate at the same time, or such that one or more ticket bursters are back-ups in case there is an issue with one of the other ticket bursters.

It should be appreciated from the above that various embodiments of the present disclosure provide a lottery ticket vending machine comprising: (1) a machine housing comprising an openable front door, the front door comprising a ticket collection receptacle, the ticket collection receptacle defining a ticket receiving slot; (2) a ticket drawer column in the machine housing, the ticket drawer column comprising a plurality of ticket drawers, each of the ticket drawers configured to hold a pack of lottery tickets; (3) a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the ticket receiving slot of the ticket collection receptacle; (4) a sensor connected to one of a wall of the ticket burster and a wall of the ticket collection receptacle; (5) a target connected to the other of the wall of the ticket burster and the wall of the ticket collection receptacle; and (6) a controller configured to cause the ticket burster to move to the ticket dispense position based on a signal from the sensor when the sensor senses the target. In various such embodiments, the sensor is connected to the wall of the ticket burster and the target is connected to the wall of the ticket collection receptacle. In various such embodiments, the sensor is connected to the wall of the ticket burster, the wall of the ticket collection receptacle defines the ticket receiving slot, and the target is connected to the wall of the ticket collection receptacle. In various such embodiments, the wall of the ticket burster defines the ticket outlet of the ticket burster, the sensor is connected to the wall of the ticket burster, and the target is connected to the wall of the ticket collection receptacle. In various such embodiments, the wall of the ticket burster defines the ticket outlet of the ticket burster, the sensor is connected to the wall of the ticket burster, the wall of the ticket collection receptacle defines the ticket receiving slot, and the target is connected to the wall of the ticket collection receptacle. In various such embodiments, the wall of the ticket burster defines the ticket outlet of the ticket burster, the sensor is connected to the wall of the ticket burster below the ticket outlet of the ticket burster, the wall of the ticket collection receptacle defines the ticket receiving slot, and the target is connected to the wall of the ticket collection receptacle below the ticket receiving slot. In various such embodiments, the wall of the ticket burster defines the ticket outlet of the ticket burster, the sensor is connected to the wall of the ticket burster above the ticket outlet of the ticket burster, the wall of the ticket collection receptacle defines the ticket receiving slot, and the target is connected to the wall of the ticket collection receptacle above the ticket receiving slot. In various such embodiments, the sensor is below the ticket outlet of the ticket burster and the target is below the ticket receiving slot of the ticket collection receptacle. In various such embodiments, the sensor is below the ticket receiving slot of the ticket collection receptacle and the target is below the ticket outlet of the ticket burster. In various such embodiments, the sensor is above the ticket outlet of the ticket burster and the target is above the ticket receiving slot of the ticket collection receptacle. In various such embodiments, the sensor is above the ticket receiving slot of the ticket collection receptacle and the target is above the ticket outlet of the ticket burster. In various such embodiments, the sensor is connected to the wall of the ticket collection receptacle and the target is connected to the wall of the ticket burster. In various such embodiments, the sensor is one of an optical sensor, a camera, a magnetic field sensor, and a mechanical switch. In various such embodiments, the target is one of a reflective target, an image target, a magnetic target, and activator target.

It should be further appreciated from the above that various embodiments of the present disclosure provide a lottery ticket vending machine comprising: (1) a machine housing comprising an openable front door, the front door comprising a ticket collection receptacle, the ticket collection receptacle defining a ticket receiving slot; (2) a plurality of ticket drawer columns in the machine housing, each ticket drawer column comprising a plurality of ticket drawers, each of the ticket drawers configured to hold a pack of lottery tickets; (3) a plurality of ticket bursters in the machine housing, each ticket burster associated with a different one of the ticket drawer columns, each ticket burster defining a ticket inlet and a ticket outlet, each ticket burster movable to a separate ticket dispense position adjacent to the ticket collection receptacle and such that the ticket outlet of that ticket burster is aligned with the ticket receiving slot of the ticket collection receptacle; (4) a plurality of sensors, each sensor connected to a different one of the ticket bursters; (5) a target connected to the ticket collection receptacle; and (6) a controller configured to cause each of the ticket bursters to move to the ticket dispense position for said ticket burster based on signals from the sensor connected to said ticket burster when said sensor senses the target. In various such embodiments, the sensors are below the ticket outlets of the ticket bursters and the target is below the ticket receiving slot of the ticket collection receptacle. In various such embodiments, the sensors are above the ticket outlets of the ticket bursters and the target is above the ticket receiving slot of the ticket collection receptacle.

It should be further appreciated from the above that various embodiments of the present disclosure provide a lottery ticket vending machine comprising: (1) a machine housing comprising an openable front door, the front door comprising a ticket collection receptacle, the ticket collection receptacle defining a ticket receiving slot; (2) a plurality of ticket drawer columns in the machine housing, each ticket drawer column comprising a plurality of ticket drawers, each of the ticket drawers configured to hold a pack of lottery tickets; (3) a plurality of ticket bursters in the machine housing, each ticket burster associated with a different one of the ticket drawer columns, each ticket burster defining a ticket inlet and a ticket outlet, each ticket burster movable to a separate ticket dispense position adjacent to the ticket collection receptacle and such that the ticket outlet of that ticket burster is aligned with the ticket receiving slot of the ticket collection receptacle; (4) a plurality of targets, each target connected to a different one of the ticket bursters; (5) a plurality of sensors connected to the ticket collection receptacle; and (6) a controller configured to, for each of the ticket bursters, to move the ticket burster to the ticket dispense position for said ticket burster based on signals from the sensor connected to the ticket collection receptacle and associated with said ticket burster when said sensor sense the target connected to said ticket burster. In various such embodiments, the sensors are below the ticket receiving slot of the ticket collection receptacle and the targets are below the ticket outlets of the ticket bursters. In various such embodiments, the sensors are above the ticket receiving slot of the ticket collection receptacle and the targets are above the ticket outlets of the ticket bursters.

It should further be appreciated that the movable ticket burster of the present disclosure can replace the multiple stationary dispensing devices that are respectively mounted in front of each of the respective ticket drawers in various known instant lottery ticket vending machines. It should also be appreciated that by eliminating the multiple stationary dispensing devices, a greater quantity of ticket drawers can be employed than in various known instant lottery ticket vending machines.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:

a machine housing comprising an openable front door, the front door comprising a ticket collection receptacle, the ticket collection receptacle comprising an inner wall defining an elongated and horizontally extending ticket receiving slot;

a ticket drawer column in the machine housing, the ticket drawer column comprising a plurality of ticket drawers, each of the ticket drawers configured to hold a pack of lottery tickets;

a ticket burster in the machine housing, the ticket burster comprising an inner wall defining a ticket inlet and an outer wall defining a ticket outlet such that the ticket inlet is vertically higher than the ticket outlet, the ticket burster comprising a ticket cutter, the ticket burster movable to each of a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with part of the elongated and horizontally extending ticket receiving slot of the ticket collection receptacle to enable transfer of one of the lottery tickets of the pack of lottery tickets in the ticket burster through the outlet of the ticket burster and through the part of the elongated and horizontally extending ticket receiving slot and into the ticket collection receptacle;

a sensor connected to an outer wall of the ticket burster adjacent to the ticket outlet defined by the outer wall of the ticket burster;

an elongated target connected to the inner wall of the ticket collection receptacle adjacent to the elongated and horizontally extending ticket receiving slot defined by the inner wall of the ticket collection receptacle and configured to be sensed by the sensor to ensure that the ticket burster is properly aligned with the ticket collection receptacle before the transfer of the one of the lottery tickets of the pack of lottery tickets in the ticket burster through the outlet of the ticket burster and through the part of the elongated and horizontally extending ticket receiving slot and into the ticket collection receptacle; and a controller configured to cause the ticket burster to move to the ticket dispense position based on a signal from the sensor when the sensor senses the target.

2. The lottery ticket vending machine of claim 1, wherein the sensor is connected to the outer wall of the ticket burster below the ticket outlet of the ticket burster, and the target is connected to the inner wall of the ticket collection receptacle below the elongated and horizontally extending ticket receiving slot.

3. The lottery ticket vending machine of claim 1, wherein the sensor is connected to the outer wall of the ticket burster above the ticket outlet of the ticket burster, and the target is connected to the inner wall of the ticket collection receptacle above the elongated and horizontally extending ticket receiving slot.

4. The lottery ticket vending machine of claim 1, wherein the sensor is one of an optical sensor, a camera, a magnetic field sensor, and a mechanical switch.

5. The lottery ticket vending machine of claim 1, wherein the target is one of a reflective target, an image target, a magnetic target, and activator target.

6. A lottery ticket vending machine comprising:

a machine housing comprising an openable front door, the front door comprising a ticket collection receptacle, the ticket collection receptacle comprising an inner wall defining an elongated and horizontally extending ticket receiving slot;

a plurality of ticket drawer columns in the machine housing, each ticket drawer column comprising a plurality of ticket drawers, each of the ticket drawers configured to hold a pack of lottery tickets;

a plurality of ticket bursters in the machine housing, each ticket burster comprising a ticket cutter, each ticket burster associated with a different one of the ticket drawer columns, each ticket burster comprising an inner wall defining a ticket inlet and an outer wall defining a ticket outlet such that the ticket inlet is vertically higher than the ticket outlet, each ticket burster movable to a separate ticket dispense position adjacent to the ticket collection receptacle and such that the ticket outlet of that ticket burster is spaced-apart from and aligned with part of the elongated and horizontally extending ticket receiving slot of the ticket collection receptacle to enable transfer of one of the lottery tickets of the pack of lottery tickets in the ticket burster through the outlet of the ticket burster and through the part of the elongated and horizontally extending ticket receiving slot and into the ticket collection receptacle;

a plurality of sensors, each sensor connected to the outer wall of a different one of the ticket bursters adjacent to the ticket outlet of said ticket burster;

a target connected to the inner wall of the ticket collection receptacle adjacent to the elongated and horizontally extending ticket receiving slot and configured to be sensed by one of the plurality of sensors before the transfer of the one of the lottery tickets of the pack of lottery tickets in the ticket burster through the outlet of the ticket burster and through the part of the elongated and horizontally extending ticket receiving slot and into the ticket collection receptacle; and a controller configured to cause each of the ticket bursters to move to the ticket dispense position for said ticket burster based on signals from the sensor connected to said ticket burster when said sensor senses the target.

7. The lottery ticket vending machine of claim 6, wherein the sensors are below the ticket outlets of the ticket bursters and the target is below the elongated and horizontally extending ticket receiving slot of the ticket collection receptacle.

8. The lottery ticket vending machine of claim 6, wherein the sensors are above the ticket outlets of the ticket bursters and the target is above the elongated and horizontally extending ticket receiving slot of the ticket collection receptacle.

9. A lottery ticket vending machine comprising:

a machine housing comprising an openable front door, the front door comprising a ticket collection receptacle, the ticket collection receptacle comprising an inner wall defining an elongated and horizontally extending ticket receiving slot;

a plurality of ticket drawer columns in the machine housing, each ticket drawer column comprising a plurality of ticket drawers, each of the ticket drawers configured to hold a pack of lottery tickets;

a plurality of ticket bursters in the machine housing, each ticket burster comprising a ticket cutter, each ticket burster associated with a different one of the ticket drawer columns, each ticket burster comprising an inner wall defining a ticket inlet and an outer wall defining a ticket outlet such that the ticket inlet is vertically higher than the ticket outlet, each ticket burster movable to a separate ticket dispense position adjacent to the ticket collection receptacle and such that the ticket outlet of that ticket burster is spaced-apart from and aligned with part of the elongated and horizontally extending ticket receiving slot of the ticket collection receptacle to enable transfer of one of the lottery tickets of the pack of lottery tickets in the ticket burster through the outlet of the ticket burster and through the part of the elongated and horizontally extending ticket receiving slot and into the ticket collection receptacle;

a plurality of sensors connected to the inner wall of the ticket collection receptacle adjacent to the elongated and horizontally extending ticket receiving slot;

a plurality of separate targets, each separate target connected to the outer wall of a different one of the ticket bursters adjacent to the ticket outlet defined by the outer wall of said ticket burster and configured to be sensed by one of the plurality of sensors before the transfer of the one of the lottery tickets of the pack of lottery tickets in the ticket burster through the outlet of the ticket burster and through the part of the elongated and horizontally extending ticket receiving slot and into the ticket collection receptacle; and a controller configured to, for each of the ticket bursters, to move the ticket burster to the ticket dispense position for said ticket burster based on signals from the sensor connected to the ticket collection receptacle and connected to said ticket burster when said sensor senses the target connected to said ticket burster.

10. The lottery ticket vending machine of claim 9, wherein the sensors are below the elongated ticket and horizontally extending receiving slot of the ticket collection receptacle and the targets are below the ticket outlets of the ticket bursters.

11. The lottery ticket vending machine of claim 9, wherein the sensors are above the elongated and horizontally extending ticket receiving slot of the ticket collection receptacle and the targets are above the ticket outlets of the ticket bursters.

* * * * *